M. C. OVERMAN.
TIRE.
APPLICATION FILED JUNE 21, 1913.

1,189,730.

Patented July 4, 1916.
2 SHEETS—SHEET 1.

Attest:
Leonard Herman Jobs
Edna A. Morland

Inventor:
Max Cyrus Overman
by Geo. Scherr Jr, Atty

M. C. OVERMAN.
TIRE.
APPLICATION FILED JUNE 21, 1913.

1,189,730.

Patented July 4, 1916.
2 SHEETS—SHEET 2.

WITNESSES:
Leonard Herman Gohn
Edna A. Moreland

INVENTOR
Max Cyrus Overman
BY
E. W. Scherr
ATTORNEYS

UNITED STATES PATENT OFFICE.

MAX CYRUS OVERMAN, OF NEW YORK, N. Y.

TIRE.

1,189,730.

Specification of Letters Patent.  Patented July 4, 1916.

Application filed June 21, 1913. Serial No. 774,955.

*To all whom it may concern:*

Be it known that I, MAX CYRUS OVERMAN, a citizen of the United States, residing at New York, in the county and State of New York, have invented certain new and useful Improvements in Tires, of which the following is a specification.

My invention relates to improvements in tires including those of my own invention, and these improvements present features and advantages which will be apparent to those skilled in the art from an understanding of the following description in connection with the drawings.

Figure 1:
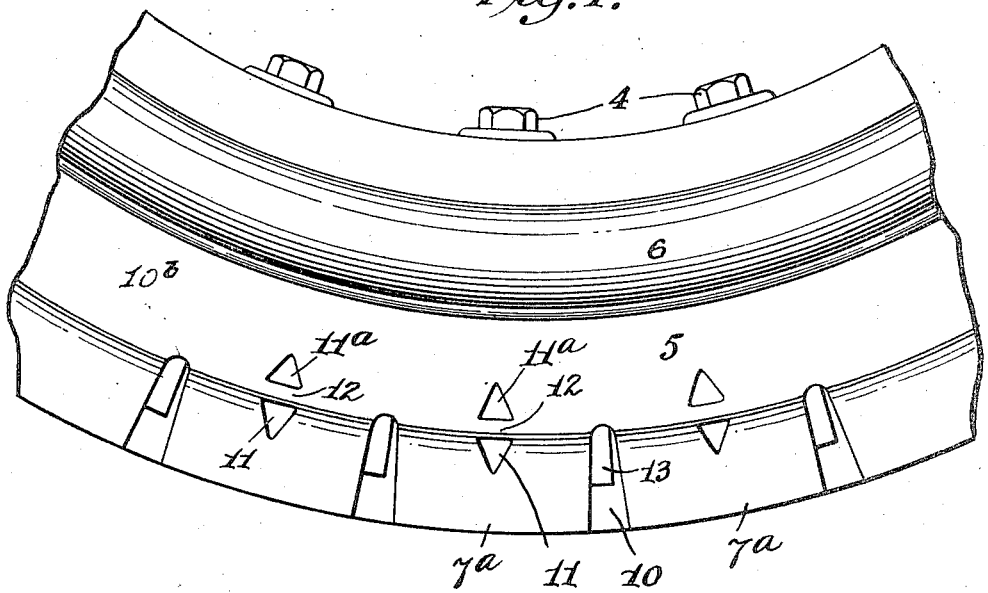
Figure 2:
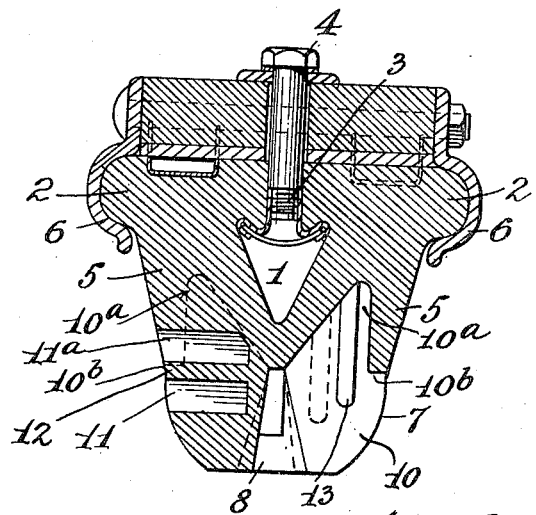
Figure 3:
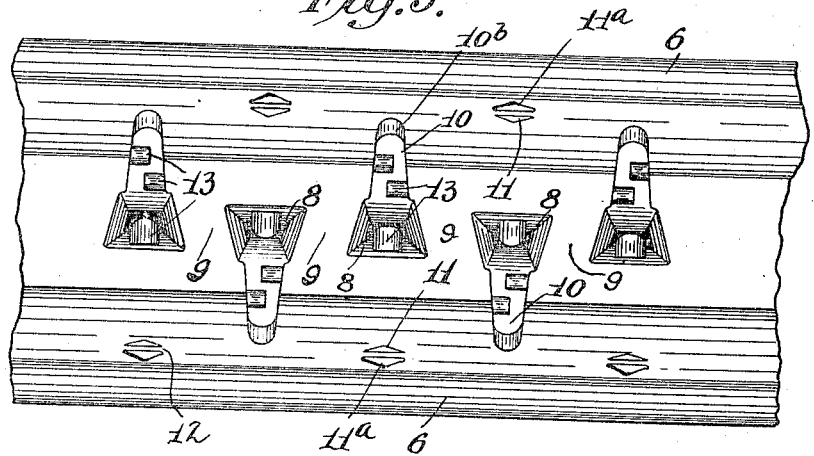
Figure 4:
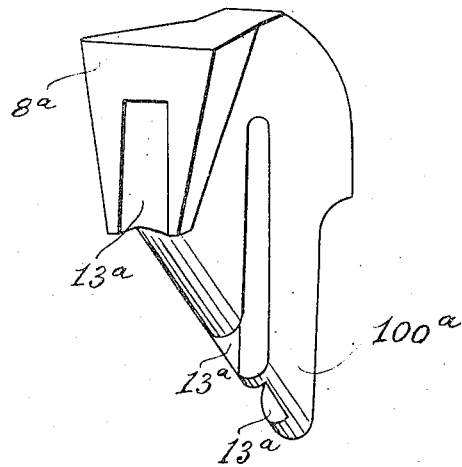

In the drawings, Figure 1 is a fragment in side elevation of a rubber vehicle tire embodying my improvements; Fig. 2 is a cross sectional view of the tire of Fig. 1; Fig. 3 is a plan view of the tread of the same tire; Fig. 4 is a perspective view on enlarged scale compared to the previous figures, of one of the cores or inserts used in the manufacture of this tire for forming one of the transverse spaces with conjoined part of the longitudinal space together with the pebble-ejecting projections.

I will now describe the specific devices of the drawings, reserving it to the claims to point out the novel features and to define the scope of the invention, it being understood that the claims will be given the due range of equivalents to which they may be entitled in view of the art.

It will be unnecessary to describe the wheel felly and tire securing devices since these are now well known and form no part of my present improvements.

The tire shown is of the cushion type and in the main is the same as that already shown by me in other Letters Patent, and I have used this tire to show the application of the two main improvements constituting my present invention. These improvements are—(1st) I have greatly deepened the transverse tread-grooves so that they now have portions 10ª which extend well up through the central portions of the side walls 5 adjacent the V-shaped opening. (2d) I have let into the sides of the individual nose sections triangular openings opposed base to base and separated by a longitudinally extending web.

Describing the illustrated tire and the aforesaid improvements more in detail, its cross section (see Fig. 2) is generally trapezoidal and it has a longitudinal opening 1 extending through or around it, the cross section of which is V-shaped.

2—2 are the base portions of the tire divided from each other by an upright longitudinal space shown occupied in Fig. 2 by the stem 3 of one of the tire-securing or clamping devices 4 of which there are a plurality disposed around the wheel.

5—5 are the thick, substantially straight, steeply converging load-supporting side walls adjacent the V-shaped opening 1 below the wheel flanges 6.

7 is the deep load-supporting nose portion of the tire extending across the lower ends of the side walls 5—5 and across the apex of the V-shaped opening. The bottom of the nose has a wide ground contact under the side walls 5. The nose is deeply divided into two laterally flexible halves under these side walls 5 by a deep central longitudinal tread-weakening 8 which may be regarded as being a groove or trough which has been bridged at intervals by transverse tread webs 9. Further, each half of the nose is made longitudinally flexible by deep upright or radial transverse grooves or spaces 10 extending from the sides of the nose or tread into the longitudinal groove 8. These spaces 10 in the two halves of the nose alternate with each other as best shown in the plan view Fig. 1; and at 10ª extend deeply up through the central portions of the side walls 5. These spaces 10 open through the sides of the tire only toward the tread and do not do so at their upper ends 10ª. This is shown in Figs. 1 and 2 where the tops of the places where the spaces 10 open through the sides of the tire are designated 10ᵇ.

The result of the foregoing construction is that the deep nose portion is divided into deeply laterally flexible halves, and these in turn into deeply longitudinally flexible nose sections in continuity of the corresponding flexibilities of the side walls 5; and these nose sections together with said walls firmly support the load; and the extended tops 10ª of the spaces 10, by coring out the walls 5, give them augmented flexibilities in graded continuity with the flexibilities of the nose sections, being intermediate the greater flexibility of said sections and the relatively slight flexibility of the base portions 2—2 of the tire. Further, this coring out of the side walls 5 is important for other reasons; since, for instance, it increases their resiliency without lessening their lateral or longitudinal stability or ability to stand up under work without bending collapse.

Into the outer side portion of each tread section 7ª, I form an opening 11 extending inwardly to a greater or less extent through the section, said opening being triangular, or substantially or equivalently triangular, in cross section. On top of this and disposed base to base thereto separated by a longitudinally extending web 12, I form another similar opening 11ª. The effect is to augment considerably the resiliency of the nose sections while still maintaining an all sufficient lateral and longitudinal stability.

The use of two opposed small triangular openings is advantageous over using only one of the combined cross section of the other two, because in this particular location the larger opening would give less stability. On the other hand, the ends of the webs 12 and the sides of the small opposed triangles are backed up by the adjacent thick masses of rubber (see Fig. 1) and are very stable. Further, it will be noted that the augmented resiliency of the tire as a whole, due to these openings, makes up for any loss of resiliency due to the wearing down of the nose so that even a greatly worn tire will still be sufficiently resilient for good riding.

My present improvements are valuable especially for use in connection with a tire made of relatively soft flexible compound as distinguished from a stiffly flexible compound such as that commonly used for the treads of ordinary pneumatic tires.

13—13 are a series of nipples or projections located in the lateral and longitudinal grooves or spaces so as to extend integrally from the bottom and sides thereof, and they serve to eject pebbles and, in fact, prevent the tire from picking up these or other objects.

The expressions in the description and claims directed to the up and down relationship of the parts of the tire refer to a section of the tire positioned as if in ground contact as in Fig. 2.

What I claim is:

1. A tire comprising a deep nose portion with a deep longitudinally extending central tread-weakening and deep transverse tread-weakenings leading from the sides of the nose to said central weakening, thereby forming the nose into deep laterally and longitudinally flexible load-supporting sections, said sections each having a substantially triangular cross-sectioned hole in its side.

2. A tire comprising a deep nose portion with a deep longitudinally extending central tread-weakening and deep transverse tread-weakenings leading from the sides of the nose to said central weakening, thereby forming the nose into deep laterally and longitudinally flexible load-supporting sections, said sections each having two substantially triangular cross-sectioned holes in its side, opposed base to base, where they are separated by a longitudinally extending web.

3. A tire comprising a deep nose portion with a deep longitudinally extending central tread-weakening and deep transverse tread-weakenings leading from the sides of the nose to said central weakening, thereby forming the nose into deep laterally and longitudinally flexible load-supporting sections, said sections each having two substantially triangular cross-sectioned holes in its side, opposed base to base, where they are separated by a longitudinally extending web, said longitudinal webs being located in or about the zone of the tops of the transverse weakenings where they open through the sides of the nose.

4. A tire comprising a deep nose portion with a deep longitudinally extending central tread-weakening and deep transverse tread-weakenings leading from the sides of the nose to said central weakening, thereby forming the nose into deep laterally and longitudinally flexible load-supporting sections, said sections each having two substantially triangular cross-sectioned holes in its side, opposed base to base, where they are separated by a longitudinally extending web, the transverse tread-weakenings extending up into the tire and thence downwardly and out at the sides of the nose, the aforesaid longitudinal webs being located in or about the weakening zone of the tops of said transverse weakenings where they open through the sides of the nose.

5. A tire comprising a deep nose portion with a deep longitudinally extending central tread-weakening and deep transverse tread-weakenings leading from the sides of the nose to said central weakening, thereby forming the nose into deep laterally and longitudinally flexible load-supporting sections, said sections each having a substantially triangular cross-sectioned hole in its side of substantially uniform cross section throughout its length.

6. A tire comprising a deep nose portion with a deep longitudinally extending central tread-weakening and deep transverse tread-weakenings leading from the sides of the nose to said central weakening, thereby forming the nose into deep laterally and longitudinally flexible load-supporting sections, said sections each having a transversely extending hole let into its side.

7. A tire having a deep nose portion divided from the tread into deep laterally and longitudinally flexible sections, each having a substantially triangular cross-sectioned hole formed in its side with its apex directed toward the tread.

8. A tire having a deep nose portion divided from the tread into deep laterally and longitudinally flexible sections, each having two substantially triangular cross-sectioned holes in its side, opposed base to base, where they are separated by a longitudinally extending web.

9. A hollow cushion tire comprising the combination of flange-free walls containing the hollow of the tire between them and supporting the load by their vertical compression with accompanying thickening but without bending collapse, and a wide, deep, substantial nose portion extending horizontally across the hollow of the tire in firm supporting ground-contact under said walls, said nose being longitudinally deeply weakened providing laterally flexible halves under said walls, and each half being transversely deeply weakened making said halves longitudinally flexible, said halves also, like the walls, supporting the load by their vertical compression with accompanying thickening but without bending collapse, said transverse weakenings extending up so deeply as to core out the middle portions of the walls adjacent the hollow of the tire.

10. A hollow cushion tire comprising the combination of flange-free walls containing the hollow of the tire between them and supporting the load by their vertical compression with accompanying thickening but without bending collapse, and a wide, deep, substantial nose portion extending horizontally across the hollow of the tire in firm supporting ground-contact under said walls, said nose being longitudinally deeply weakened providing laterally flexible halves under said walls, and each half being transversely deeply weakened making said halves longitudinally flexible, said halves also, like the walls, supporting the load by their vertical compression with accompanying thickening but without bending collapse, said transverse weakenings extending up so deeply as to core out the middle portions of the walls adjacent the hollow of the tire, the sides of the tire between the aforesaid transverse openings having let into them substantially triangular cross-sectioned holes.

11. A hollow cushion tire comprising the combination of flange-free walls containing the hollow of the tire between them and supporting the load by their vertical compression with accompanying thickening but without bending collapse, and a wide, deep, substantial nose portion extending horizontally across the hollow of the tire in firm supporting ground-contact under said walls, said nose being longitudinally deeply weakened providing laterally flexible halves under said walls, and each half being transversely deeply weakened making said halves longitudinally flexible, said halves also, like the walls, supporting the load by their vertical compression with accompanying thickening but without bending collapse, the sides of said tire between the aforesaid transverse weakenings having paired substantially triangular cross-sectioned holes formed therein, each pair being opposed base to base where they are separated by a longitudinally extending web.

12. A hollow cushion tire comprising the combination of flange-free walls containing the hollow of the tire between them and supporting the load by their vertical compression with accompanying thickening but without bending collapse, and a wide, deep, substantial nose portion extending horizontally across the hollow of the tire in firm supporting ground-contact under said walls, said nose being longitudinally deeply weakened providing laterally flexible halves under said walls, and each half being transversely deeply weakened making said halves longitudinally flexible, said halves also, like the walls, supporting the load by their vertical compression with accompanying thickening but without bending collapse, the sides of said tire between the aforesaid transverse weakenings having holes which extend inwardly therethrough.

In testimony whereof, I affix my signature in presence of two witnesses.

MAX CYRUS OVERMAN.

Witnesses:
 E. W. SCHERR, Jr.,
 JESSIE BAUMANN.

It is hereby certified that in Letters Patent No. 1,189,730, granted July 4, 1916, upon the application of Max Cyrus Overman, of New York, N. Y., for an improvement in "Tires," an error appears in the printed specification requiring correction as follows: Page 2, line 101, claim 4, strike out the word "weakening"; and that the said Letters Patent should be read with this correction therein that the same may conform to the record of the case in the Patent Office.

Signed and sealed this 3d day of October, A. D., 1916.

[SEAL.]

F. W. H. CLAY,
*Acting Commissioner of Patents.*